(12) United States Patent
Denk et al.

(10) Patent No.: US 7,577,190 B2
(45) Date of Patent: Aug. 18, 2009

(54) METHOD FOR PREDICTION OF A CHANNEL COEFFICIENT

(75) Inventors: Robert Denk, Grafing (DE); Berndt Pilgram, München (DE)

(73) Assignee: Infineon Technologies AG, Munich (DE)

(*) Notice: Subject to any disclaimer, the term of this patent is extended or adjusted under 35 U.S.C. 154(b) by 813 days.

(21) Appl. No.: 10/974,322

(22) Filed: Oct. 27, 2004

(65) Prior Publication Data

US 2005/0118955 A1 Jun. 2, 2005

(30) Foreign Application Priority Data

Oct. 29, 2003 (DE) .................. 103 50 362

(51) Int. Cl.
*H04B 3/46* (2006.01)
*H04B 17/00* (2006.01)
*H04Q 1/20* (2006.01)

(52) U.S. Cl. ............................ 375/224
(58) Field of Classification Search ............ 375/224, 375/324, 340; 370/241
See application file for complete search history.

(56) References Cited

U.S. PATENT DOCUMENTS 5,432,816 A * 7/1995 Gozzo .................. 375/232

FOREIGN PATENT DOCUMENTS

DE 101 41 951 A1 3/2003

OTHER PUBLICATIONS

"Finite-Length MIMO Equalization Using Canonical Correlation Analysis", Aleksandar Dogandžićand and Arye Nehorai, IEEE Transactions on Signal Processing, vol. 50, No. 4, Apr. 2002, pp. 984-989.
"Canonical Variate Analysis in Identification, Filtering, and Adaptive Control", Wallace E. Larimore, Proceedings of the 29th Conference on Decision and Control, Honolulu, Hawaii, Dec. 1990, pp. 596-604.

* cited by examiner

*Primary Examiner*—Jean B Corrielus
(74) *Attorney, Agent, or Firm*—Eschweiler & Associates, LLC

(57) ABSTRACT

The present invention provides a method for prediction of a channel coefficient for a propagation path in a mobile radio channel with multipath propagation, in which a canonical random variable analysis is used for prediction of the channel coefficient. The method is preferably used in an estimator for channel coefficients in a base station or in a mobile station in a mobile radio system.

8 Claims, 4 Drawing Sheets

METHOD FOR PREDICTION OF A CHANNEL COEFFICIENT

REFERENCE TO RELATED APPLICATIONS

This application claims the benefit of the priority date of German application DE 103 50 362.5, filed on Oct. 29, 2003, the contents of which are herein incorporated by reference in their entirety.

FIELD OF THE INVENTION

The present invention relates to channel estimation in mobile radio systems and, in particular, to a method for prediction of a channel coefficient for a propagation path in a mobile radio channel with multipath propagation.

BACKGROUND OF THE INVENTION

One up-to-date example of a mobile radio system is the Universal Mobile Telecommunications System (UMTS). The basic architecture of a UMTS mobile radio system has, inter alia, mobile stations (User Equipment (UE)) and a radio access network (UMTS Terrestrial Radio Access Network (UTRAN)). The radio access network contains devices for transmission of data by radio, for example base stations that are referred to as node B in UMTS mobile radio systems. The base stations each supply one specific area or a cell, in which mobile stations may be located. The interface between a mobile station and a base station whose communication takes place without the use of wires by radio is referred to as a radio interface (Uu Interface).

In a UMTS radio telecommunications system, digital data to be transmitted is first of all subjected to channel coding, in order to provide it with redundancy. The digital data is then distributed by means of a multiple access method between physical channels, within the time frame of the available transmission bandwidth. Finally, the digital data is digitally modulated in order to be transmitted via a mobile radio channel. The mobile radio channel is subdivided in time or frequency by means of a time-division duplexing method (TDD; TDD=Time Division Duplex) or a frequency-division duplexing method (FDD; FDD=Frequency Division Duplex) for transmission and reception.

The UMTS Standard and the 3GPP Standard (Third Generation Partnership Project) use the code division multiple access method (CDMA; CDMA=Code Division Multiple Access) as the multiple access method, in which a bipolar data bit stream to be transmitted is multiplied and spread by a subscriber-specific bipolar code sequence and a spreading code, respectively. The elements of the spreading code are called chips, in order to make it possible to semantically distinguish them from bits in the data bit stream. In principle, chips are nothing more than bits. The multiplication of the data bit stream by the chip stream once again results in a bipolar datastream. In general, the rate of the chip stream is a multiple of the rate of the data bit stream, and is determined by the length of the spreading code, which is indicated by a spreading factor (SF). The spreading factor corresponds to the number of chips per bit.

All of the subscribers use the multiple access method to apply a fingerprint to their payload data by means of a subscriber-specific spreading code, allowing a transmitted signal to be reproduced from a sum of received signals. The bits of the data bit stream can be recovered from the chip sequence received in the receiver by repeating the multiplication process. For this purpose, the chip stream is multiplied or correlated, once again in the correct phase, by the same spreading code that has already been used in the transmitter, from which the transmitted data bit stream is once again obtained. Different data bit streams that are intended to be transmitted in parallel from a transmitter are multiplied by different, orthogonal spreading codes or code sequences, and are then added. The sum signal is then also subjected to so-called scrambling, which is carried out by chip-by-chip multiplication of the sum signal by a specific scrambling code that, for example, identifies the base station.

Quaternary phase shift keying (QPSK) is used as the modulation method for the UMTS mobile radio system, in which two successive chips (bits) in a chip sequence to be transmitted are in each case combined to form a chip pair. One chip pair in each case forms one symbol in a symbol area (which is covered by an in-phase branch (I) and a quadrature branch (Q) of the QPSK modulation) in the complex plane, which has four elements. Since the modulation method has four values, two chips are thus in each case transmitted per modulation step. The gross chip rate is thus twice as great as the modulation rate.

In the TDD mode, a physical channel is defined by the spreading code that is used, by a time slot and by the frequency channel. In contrast, in the FDD mode, a physical channel is defined by the spreading code and by the frequency channel. A distinction is generally drawn between so-called dedicated physical channels and common physical channels. A dedicated physical channel is used exclusively by one connection and is reassigned when a connection is set up and, possibly, during the connection. Common physical channels are used by two or more connections at the same time or alternately.

In the FDD mode, physical channels are, for example, the dedicated physical channel (DPCH), the common physical control channel (CCPCH; CCPCH=Common Control Physical Channel), the common pilot channel (CPICH) and the synchronization channel (SCH). The common pilot channel CPICH is used to assist macrodiversity on the downlink path. In the case of macrodiversity, the mobile station has a radio connection to two or more base stations or cells in order, for example, to allow a soft handover, or a soft change between cells. An identical, predefined and thus known, symbol sequence is transmitted via the CPICH. Furthermore, the CPICH can thus be used to estimate channel distortion, with the aid of this known symbol sequence. The size of the CPICH is normally 6 symbols.

During operation of a mobile radio system, the mobile radio channel is characterized by multipath propagation (reflection, diffraction, scatter etc.) of the transmitted signals, time dispersion and Doppler distortion. When multipath propagation occurs, a radio signal which has been transmitted from a transmitter, for example a base station, can reach a receiver, for example a mobile station, on two or more different propagation paths, which change all the time and differ from one another by having different delay times, phase angles and levels.

Figure 1:
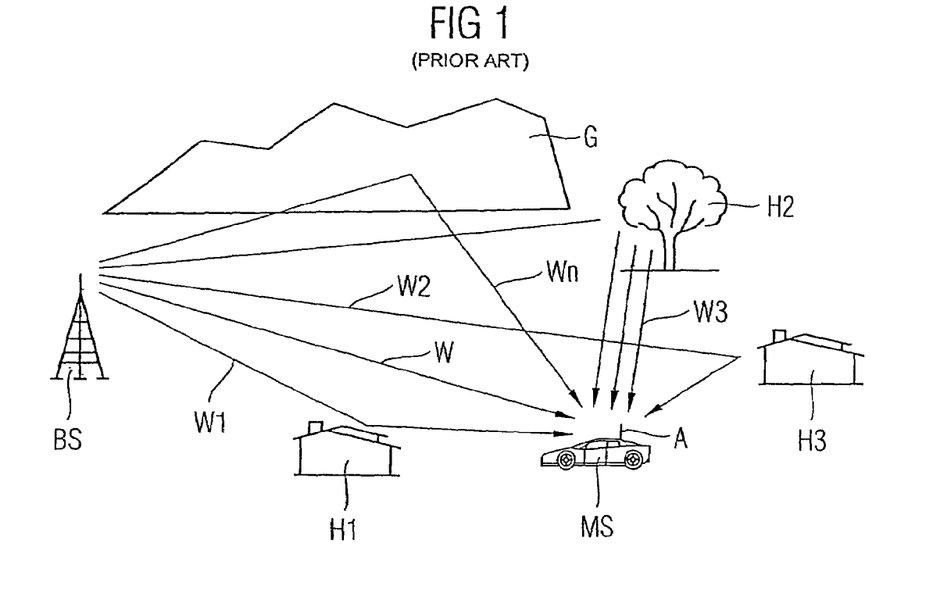
FIG. 1 shows possible propagation paths of transmitted signals in a mobile radio system.

FIG. 1 shows the possible propagation paths of transmitted signals in a mobile radio system using the example of signals which have been transmitted by a base station BS to a mobile station MS. Apart from a signal component on a direct propagation path W, a range of signal components which have been reflected in the far field of the receiving antenna A of the mobile station MS on obstructions H1 to H3 or, for example, on a mountain range G, reach the mobile station MS via indirect propagation paths W1 to Wn. The signal component delay is dependent on the path length differences between the individual indirect propagation paths W1 to Wn, while the levels are governed by the radio field attenuation that occurs on the corresponding propagation path. The signals that have been transmitted from a base station BS are also subject to scatter in the immediate vicinity of the mobile station MS, that is to say in the near field of the antenna A. This scatter is caused by the fact that the mobile station MS normally has an effective antenna height of about 1.5 m, while the reflective obstructions H1 to H3 in the immediate vicinity are typically higher by several factors.

The reflectivity of the surface structure of the surrounding obstructions H1 to H3 means that a wide range of accompanying, diffuse wave components, with extremely short delays between them and at levels of approximately the same magnitude reach the antenna A on the radio channel, in addition to the main wave of each signal component, which is subject to attenuation by shadowing and diffraction. Furthermore, the surface characteristics of an obstruction H1 to H3 or of the mountain range G also result in scatter at remote reflection locations, by means of which the signal components are reflected to the reception point. The mobile station MS is thus located in a dispersive field of wave components which, on average, arrive at the antenna A with a uniform distribution from all directions. The resultant sum signal for each signal component at the antenna A is obtained by vectorial addition of the wave components, while the resultant phase describes the phase angle between the direct wave and the resultant vector.

If the mobile station MS and/or the reflection locations involved are stationary, and are not moving, the level and the phase of the sum signal for each signal component does not change. However, if the mobile station MS is moving, those wave components which arrive at the antenna A from the movement direction are subject to more or less pronounced positive Doppler shifts, depending on the incidence angle. At the same time, those wave components that arrive from the opposite direction are subject to negative Doppler shifts. This symmetrical Doppler distribution necessarily leads to a relatively symmetrical Doppler spectrum on the frequency axis. The vectorial addition of the wave components and the influence of the movement of the mobile station MS mean that the different Doppler shifts of the dispersive wave components which are associated with the individual signal components lead to position-dependent, stochastic level and phase fluctuations for each signal component. These level and phase fluctuations are, however, vectorially linked to one another. The stochastic fluctuations of the signal components that are received via different indirect propagation paths are, however, uncorrelated. The distribution probability of the level fluctuations corresponds to a so-called Rayleigh distribution, and is generally referred to as Rayleigh fading, while the phase fluctuations are uniformly distributed and are referred to as parasitic phase noise (random phase noise).

A range of signal components which arrive successively in time and are caused by relatively long indirect propagation paths in the far field of the antenna A thus occur on the mobile radio channel. Owing to the near field scatter, the sum level of each signal component is subject to level fluctuations (which are independent of one another, are distributed three-dimensionally, are stochastic and are speed-dependent) and to phase fluctuations, which are correlated with them. In addition, each signal component has the Doppler spectrum, which is independent of the level fluctuation but also varies as a function of position, and whose spectral width is likewise speed-dependent. Finally, all of the signal components that are reflected in the far field are subject to a position-dependent delay with respect to the direct propagation path W, owing to the position dependency of the multipath profile.

The mobile radio channel in a mobile radio system may in general be represented by a time-variant channel impulse response $h(\tau, t)$, whose Fourier transform is the time-variant channel transfer function. The channel impulse response represents the response at the time t to an impulse at the time t−τ. The signal which is transmitted through the mobile radio channel may be represented in a receiver as the sum of a large number of waves which arrive at different times and have different levels, phase angles, polarizations and Doppler frequencies as a result of reflection, diffraction and scatter. The channel impulse response for N propagation paths is:

$$h(\tau, t) = \sum_{n=1}^{N} \underline{h}_n(t)\delta(\tau - \tau_n) \quad \text{Equation 1}$$

where a coefficient $\underline{h}_n(t)$ represents the characteristics mentioned above of a respective propagation path n.

In order to compensate for the rotation and stretching (which occur in a mobile radio channel) of the signal received at a receiver, an estimate of the channel impulse response or channel estimation is carried out. During the channel estimation process, the coefficients of the channel impulse response are continuously matched to the channel characteristics of the individual propagation paths of the mobile radio channel in order to update the estimate. The purpose of channel estimation is to determine data from a received signal with a lower bit error rate and to know in advance the channel when data arrives at a receiver. The channel estimation process allows the disturbance influences which are typical of the method to be detected on the basis of a plausible profile of the channel characteristics, and allows reliable estimated values to be obtained for the assessment of the immediately next characters (as well as previous characters) in the payload data for each signal component, thus allowing reliable statements to be made about the mobile radio channel. Implausible discrepancies, such as those caused by noise and burst disturbances, are identified and largely eliminated. As mentioned, the mobile radio channel is a multiple path with Rayleigh fading and, in particular, with additive, physical white noise. The channel estimate is disturbed in particular by the additive white noise.

The coefficients of the channel impulse response, which are also referred to as channel coefficients, can be estimated using various solution approaches. In the simplest case, a simple low-pass filter may in each case be used for estimation of a channel coefficient for a propagation path. This low-pass filter has a cut-off frequency that corresponds approximately to the maximum Doppler frequency that occurs on the mobile radio channel. However, the Doppler frequency is not known in advance, since the relative speed of the mobile station is normally unknown.

Other solution approaches make use of a correlation of known pilot symbols (which are present in the transmitted signal) in a pilot signal with symbols from the received signal, in order to determine or to estimate the channel coefficients. A sequence of transmitted complex pilot symbols for one propagation path is referred to by $p_1, p_2, \ldots$ in the following text. The respective propagation path or transmission channel results in a pilot symbol $p_k$ being multiplied by a complex channel coefficient $c_k$ at a time k. Additive noise $n_k$ also occurs, so that a received symbol is in the form $y_k = p_k^* c_k + n_k$, $k=1, 2, \ldots$. The first step of a channel estimation process normally comprises correlation of a received symbol $y_k$ with the known pilot symbol $p_k$, that is to say the calculation of $x_k := y_k/p_k$. When no noise is present, $x_k = c_k$, so that it is possible to speak of an unfiltered estimated value $x_k$ for the channel coefficient $c_k$. The estimated value $x_k$ is now filtered in a second channel estimation step, in order to reduce the noise component, and the estimated value $x_{k+1}$ for the channel coefficient for a subsequent time k+1 is determined at the same time. The time interval between the times is in this case, for example, chip/2. The quotient of the received and known pilot symbols in consequence results in the channel coefficient that is currently applicable to that particular propagation path ("channel snapshot"), and this is updated at the rate of the pilot symbol. The determination of the estimated value $x_{k+1}$ for the channel coefficient in a subsequent time k+1, that is to say the prediction of the respective channel coefficient, makes it possible to minimize the memory required. This is due to the fact that, in contrast to the low-pass filtering process described above in which the filter delay time means that the channel state is not known until later, so that data items arriving in parallel must be stored, no data need be stored for the prediction of the channel characteristics, since the channel characteristics are known at all times from the prediction.

An FIR filter with a fixed filter length is normally used for filtering the additive white noise and for determining the estimated value $x_{k+1}$ for the channel coefficient at a subsequent time k+1 and/or to calculate in advance or to predict the channel coefficient. The mobile radio channel may be derived from Equation 1 by means of a filter with a finite impulse response (FIR filter) or a tap delay line.

Figure 2:
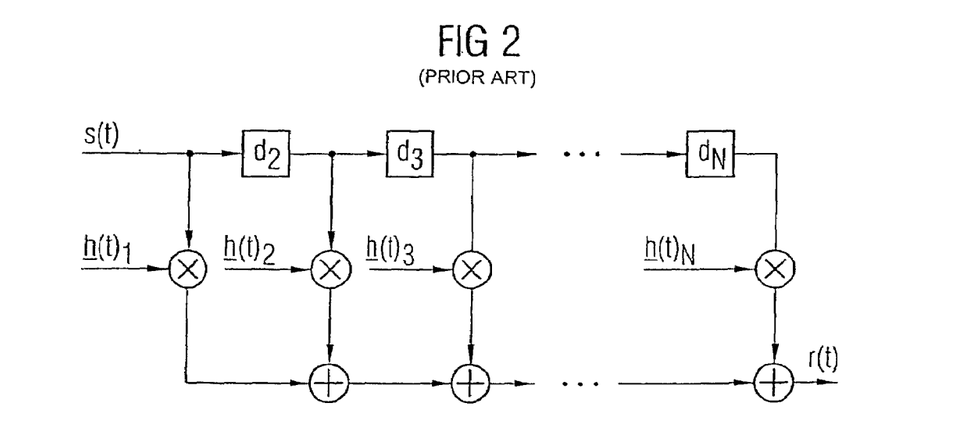
FIG. 2 shows a conventional FIR filter which can be used to represent a mobile radio channel.

FIG. 2 shows an FIR filter, which represents the mobile radio channel. The coefficients $\underline{h}_i(t)$ are the filter coefficients and correspond to the channel coefficients of the individual propagation paths. The first component $\underline{h}_1(t)\delta(\tau-\tau_1)$ of the impulse response represents the complex signal component received via the direct propagation path, where $\tau_1=0$. Every other, delayed signal component is weighted with a complex coefficient $\underline{h}_i(t)$. The delays $d_i$ in this case correspond to the time interval $\tau_i-\tau_{i-1}$ between two successively arriving signal components.

For prediction purposes, the filter coefficients are normally constructed on the basis of an optimality criterion that is known from statistical signal theory. It is particularly useful to use so-called LMMSE estimators. These are linear estimators which minimize the mean square error (LMMSE; LMMSE=Linear Minimum Mean Square Error) and which, in this context, are also known by the name "Wiener Filters". The performance of these Wiener filters is highly dependent on the filter length and on a previous estimate of the signal-to-noise ratio, and on the relative speed of the mobile station.

The coefficients of a Wiener filter of length N can be calculated explicitly by means of the equation:

$$w=(\Phi_c+N_0)^{-1}\rho_c \qquad \text{Equation 2}$$

In this case, the matrix $\Phi_c$ is defined by:

$$\Phi_c=(J_0(2\pi\omega'_D(i-j)))_{i,j=1,\ldots,N} \qquad \text{Equation 3}$$

with the relative Doppler frequency $$\omega'_D=\omega_D \cdot T=\omega_0 \cdot T \cdot v/c \qquad \text{Equation 4}$$

In this case, 1/T is the symbol rate, $\omega_0$ is the carrier frequency of the mobile radio system, v is the relative speed of the mobile station with respect to the base station, and c is the speed of light. $N_0$ in the above Equation 2 represents the noise that is superimposed on the pilot signal, and $J_0$ denotes the Bessel function of the first kind, which describes the characteristics of the transmission channel. The vector $\rho_c$ is given by the equation:

$$\rho_c=(J_0(2\pi\omega'_D(i_0-i)))_{i=1,\ldots,N} \qquad \text{Equation 5}$$

Figure 3:
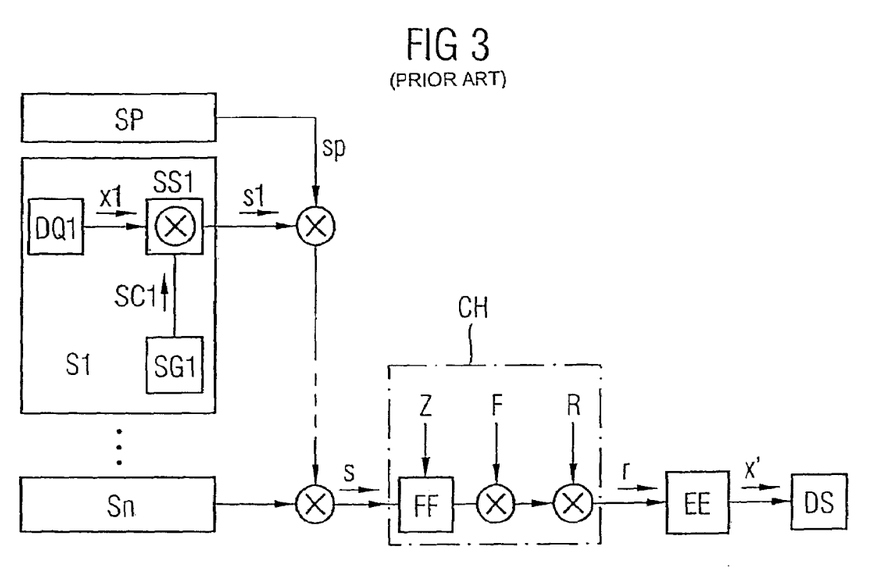
FIG. 3 shows a part of a conventional mobile radio system, from a base station to a mobile station.

FIG. 3 shows a part of a conventional mobile radio system, from a base station to a mobile station. The direction from the base station to the mobile station is referred to as the downlink direction. The base station has transmitters S1 to Sn for payload signals x, and a transmitter SP for a pilot signal sp, for example the pilot signal in the common pilot channel CPICH in the UMTS mobile radio system. The transmitters S1 to Sn and SP are CDMA transmitters. The pilot signal is transmitted in a similar way to a payload signal, but with the difference that it can be transmitted permanently and is not modulated with payload data. The signals emitted from the transmitters S1 to Sn and SP are combined and are transmitted as the transmitted signal s via a multipath transmission channel CH, which is the same for all the signals and is in the form of a mobile radio channel in the present example. At the receiving end, that is to say in the mobile station, a receiving unit EE recovers the transmitted payload signals x' from a received signal r, and passes them to a data sink.

The payload data x1 emitted from a data source DQ1 is spread in a spreading stage SS1 in the transmitter S1 using a spreading code SC1 from a spreading code generator SG1, and is emitted as the transmitted signal s1. The transmitted signal s1, which has been spread by the spreading factor, is combined with further transmitted signals which may be present and with the pilot signal sp, which has been spread in a corresponding manner by means of a spreading code, and is emitted as the transmitted signal s. On the multipath transmission channel CH, the transmitted signal s is subject to time-variant influences Z, which result from the multipath propagation of the schematically illustrated radio field FF, to radio interference or disturbances F, which may occur in the form of pulsed, burst or continuous disturbances, and to the influence of noise R. The transmitted signal s is also subject to distance-dependent attenuation in the radio field FF. In the receiving unit EE in the mobile station, the received signal r is correlated with the spreading code of the pilot signal sp and with a correlation code which corresponds to the spreading code, for example SC1, in order to recover the pilot signal on the one hand, and the payload signals x' on the other hand.

In order to reproduce the transmitted signal from a received signal r which is composed of a superimposition of signal components transmitted on the various propagation paths, it is processed in the receiving unit EE in the mobile station by means of a RAKE receiver. The RAKE receiver has fingers, which are each associated with one propagation path and are operated with a sampling delay that compensates for the delay on the corresponding propagation path. Each finger has a correlator which multiples the delayed signal component from one propagation path by a spreading code, in order to reproduce bits from the signal component which was spread at the transmitter end using the same spreading code. The output signals from the individual fingers are combined or coherently added, in order to gather the energy per symbol not only via a direct propagation path but also from a large number of indirect propagation paths, and thus to improve the communication reliability. The coherent addition process is also referred to as maximum ratio combining.

Figure 4:
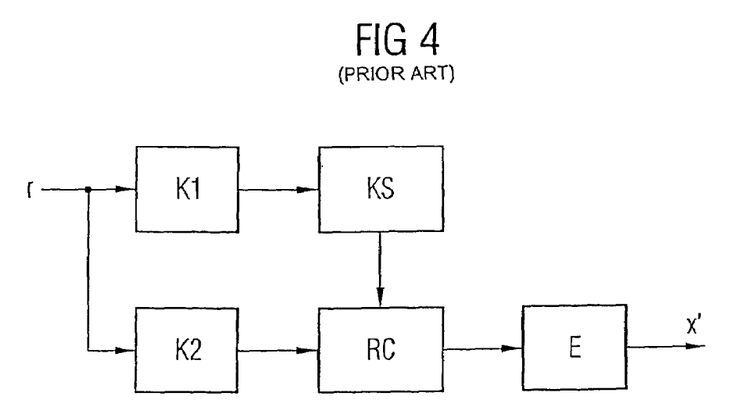
FIG. 4 shows a conventional RAKE receiver.

FIG. 4 shows a RAKE receiver that is contained in the receiving unit EE. The received signal r is correlated in a correlator K1 in the RAKE receiver with a correlation code that is matched to the spreading code of the pilot signal sp. A complex output signal from the correlator K1 is supplied to a channel estimator KS. The received signal r is also correlated in a correlator K2 with correlation codes that are matched to the correlation codes SC1 of the payload signals xi. A RAKE combiner RC carries out the coherent addition process with the signal emitted from the correlator K2 and the channel information emitted from the channel estimator KS. A downstream decision stage E uses, for example, the QPSK method to demodulate the received payload signal x' associated with the transmitted payload signal.

The channel estimator KS calculates estimated values for the channel coefficients. The estimated values control the coherent addition of the signals obtained in the correlator K2, in the RAKE combiner RC. During the estimation of the channel coefficients, the following measures must be carried out continuously:

identification of significant signal components;
estimation of the associated delay times or delays; and
estimation of the associated complex amplitudes or levels.

Figure 5:
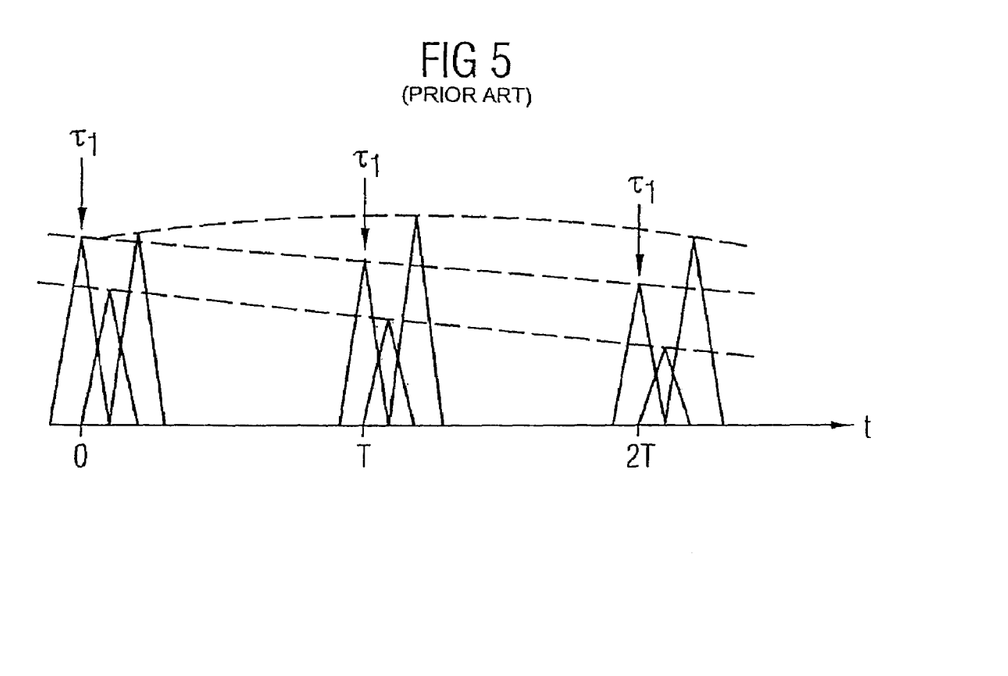
FIG. 5 shows the correlation of a received signal with a spreading code for a pilot signal.

FIG. 5 shows a schematic illustration of a time signal at the output of the correlator K1. All the values and correlation peaks of a delay $\tau_i$ at the time interval T are used to estimate a channel coefficient for one propagation path. The correlation peaks for the delay $\tau_i$ are marked by arrows.

Figure 6:
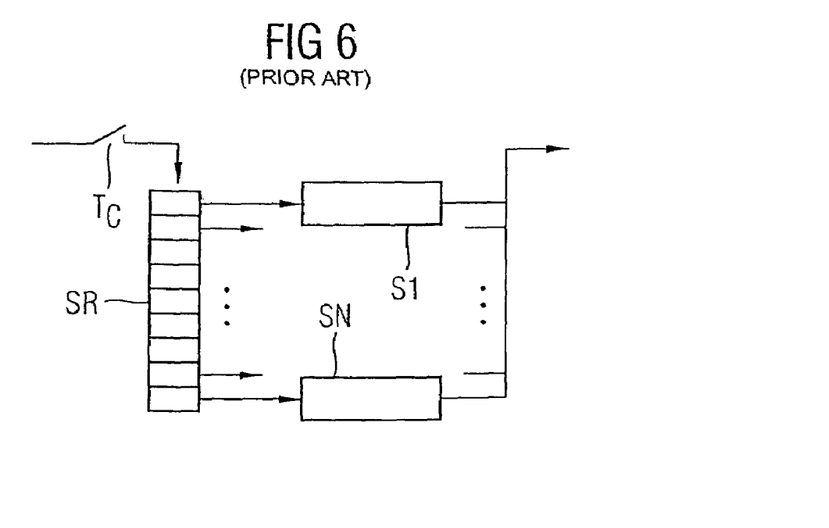
FIG. 6 shows the design of a conventional channel estimator.

FIG. 6 shows the design of a conventional channel estimator KS. The output signal from the correlator K1 shown in FIG. 4 is sampled at the time interval of a chip $T_c$. The values obtained in this way are stored at the chip rate $1/T_c$ in a shift register SR. Each individual cell in the shift register SR produces values for in each case one estimator S1 to SN that is associated with one propagation path. When the values stored in the shift register SR are processed, they are shifted onwards by the time period T. A signal for that propagation path which has the same delay $\tau_i$ is thus always applied to an estimator S. The estimators S each estimate one channel coefficient on the basis of the correlation peaks for an associated propagation path in FIG. 5. The estimators S furthermore predict the channel coefficients for a subsequent time, by means of a Wiener filter.

One disadvantage of the Wiener filter that is normally used for a prediction of channel coefficients is that the explicit calculation of the filter coefficients is complex.

A further disadvantage of the Wiener filter is that the filter coefficients depend in a complex manner on the signal-to-noise ratio and on the speed.

A further disadvantage of the Wiener filter is that the filter coefficients must be recalculated with each symbol for an exact implementation of the MMSE method so that, in practice, suboptimal variants of Wiener filtering must normally be chosen, in order to simplify the calculation.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a method for prediction of a channel coefficient for at least one propagation path of a mobile radio channel with multipath propagation, which allows the respective coefficient to be predicted easily and accurately.

The idea on which the present invention is based comprises the use of a method involving multivariate statistics, more particularly, canonical random variable analysis (CVA; CVA=Canonical Variate Analysis) rather than the MMSE method that is used with Wiener filters for predicting channel coefficients.

The invention provides a method for prediction of a channel coefficient for a propagation path in a mobile radio channel with multipath propagation, in which canonical random variable analysis is used for prediction of the channel coefficient.

According to one preferred development, the method comprises the steps of production of a past matrix P and a future matrix F from a known time series $x_k$ of estimated values of the channel coefficient; solution of the equation system: $F = B \cdot M + E$, $M = A \cdot P$ by means of the canonical random variable analysis, in order to obtain estimates $\hat{A}$ and $\hat{B}$ for matrices A and B; production of a past vector p from a new time series of known estimated values of the channel coefficient; and calculation of a prediction vector $\hat{f}$ for estimated values of the channel coefficient from the equations: $\hat{f} = \hat{B} \cdot m$ and $m = \hat{A} \cdot p$.

According to a further preferred development, the method is used in an estimator for channel coefficients in a base station or in a mobile station in a mobile radio system.

One advantage of the present invention is that the canonical random variable analysis (CVA) allows the channel coefficients to be predicted more accurately.

A further advantage of the present invention is that the amount of data used for estimation purposes in the canonical random variable analysis (CVA) is reduced while, for example, the Wiener filter uses all of the data.

A further advantage of the present invention is that the calculation requirements for the canonical random variable analysis (CVA) can be predicted, and the calculation is stable and reliable.

BRIEF DESCRIPTION OF THE DRAWINGS

Preferred exemplary embodiments of the present invention will be explained in more detail in the following text with reference to the attached drawings, in which.

DETAILED DESCRIPTION OF THE INVENTION

The preconditions for the applicability of canonical random variable analysis (CVA), and its principles, will be explained first of all in the following text. One precondition for the applicability of canonical random variable analysis (CVA) is the presence of a Markov process in which a state in the future depends on a limited number or finite number of states in the past and can be predicted from them. The behaviour of a mobile radio channel corresponds to a Markov process such as this. A linear, time-invariant, strict, time-discrete Markov process without a defined input signal is assumed. This stochastic process x is observed, for example sampled, at identical times k in order to produce a time series, which is given by:

$$x_k, k=1, 2, \ldots, N \qquad \text{Equation 6}$$

For this purpose, a past vector p is defined, with m components and with a dimension m.

$$p_{(m)} = (x_{N+1-m}, \ldots, x_{N-1}, x_N)^T \qquad \text{Equation 7}$$

The past vector p represents a total of m successive times k of $x_k$, and forms a set of m prediction variables. A future vector f whose dimension is n is also introduced.

$$f_{(n)} = (x_{N+1}, x_{N+2}, \ldots, x_{N+n})^T \qquad \text{Equation 8}$$

The future vector f represents an area of n successive times k of $x_k$, which follow the latest time k=N of the past vector p, and forms a set of n variables to be predicted.

The fundamental characteristic of a linear, time-invariant, strict and time-discrete Markov process of a finite state organization is a finite-dimensional state s. The finite-dimensional state s can be approximated by an r-dimensional memory vector m with a reduced total of r components, which is a linear map of the past vector p by means of a matrix A.

$$s \approx m_{(r)} = A_{(r \times m)} \cdot p_{(m)} \qquad \text{Equation 9}$$

The state s has the characteristic that the conditional probability for the future, taking into account the past, is identical to the conditional probability of the future based on the condition of the state s, that is to say:

$$\tilde{P}(f|p) = \tilde{P}(f|s) \qquad \text{Equation 10}$$

It follows from this that only a finite number r of combinations of the past are relevant for prediction of the future. The aim is to determine the number r of combinations of the past vector p which allow the optimum prediction of the future vector f by means of a prediction vector $\hat{f}$. The prediction vector $\hat{f}$ is a linear combination of the r-dimensional memory vector m, with the linear map of the past vector p over the matrix A being chosen such that the linear prediction vector $\hat{f}$ minimizes the prediction error. On the assumption that the relationship which describes optimum prediction of the future vector f on the basis of the past vector p is linear, the following model will be considered:

$$f_{(n)} = B_{(n \times r)} \cdot m_{(r)} + e_{(n)} \qquad \text{Equation 11}$$

$$m_{(r)} = A_{(r \times m)} \cdot p_{(m)} \qquad \text{Equation 12}$$

The memory vector m represents an intermediate set of r variables, which may be a smaller number of variables than in the past vector p (r=m). The error vector e contains prediction error variables and represents the error in the linear prediction of the future vector f by means of the matrices A and B on the basis of p. The prediction vector $\hat{f}$ for the future vector f is in consequence given by:

$$\hat{f}_{(n)} = (\hat{x}_{N+1}, \hat{x}_{N+2}, \ldots, \hat{x}_{N+n})^T = B_{(n \times r)} \cdot A_{(r \times m)} \cdot p_{(n)} =$$
$$B_{(n \times r)} \cdot m_{(r)} \qquad \text{Equation 13}$$

The predicted future for a process x is the first element $\hat{x}_{N+1}$ of the prediction vector $\hat{f}$, which represents a prediction of the future one step ahead (one step ahead prediction) in the future.

For simplification reasons, a memory matrix M will now be defined, which contains the intermediate set of r variables of memory vectors m and a finite number of past states of the respective channel coefficients, an error matrix E which contains the prediction error variables of error vectors e, a future matrix F, which contains future vectors f, and a past matrix P, which contains past vectors p. The future matrix F contains n-dimensional sections of the future, and the past matrix contains m-dimensional sections of the past and the time series $x_k$ according to Equation 6. The following equation system is thus obtained from the Equations 11 and 12:

$$F_{(n \times N+1-m)} = B_{(n \times r)} \cdot M_{(r \times N+1-m)} + E_{(n \times N+1-m)} \qquad \text{Equation 14}$$

where $$M_{(r \times N+1-m)} = A_{(r \times m)} \cdot P_{(m \times N+1-m)} \qquad \text{Equation 15}$$

The matrices F and P are constructed as follows:

$$P_{(m \times N+1-m)} = \begin{pmatrix} x_1 & \cdots & x_{N-m} & x_{N+1-m} \\ \vdots & & \vdots & \vdots \\ x_{m-1} & & x_{N-2} & x_{N-1} \\ x_m & \cdots & x_{N-1} & x_N \end{pmatrix} \qquad \text{Equation 16}$$

$$F_{(n \times N+1-m)} = \begin{pmatrix} x_{m+1} & \cdots & x_N & x_{N+1} \\ x_{m+2} & & x_{N+1} & x_{N+2} \\ \vdots & & \vdots & \vdots \\ x_{m+n} & \cdots & x_{N+n-1} & x_{N+n} \end{pmatrix} \qquad \text{Equation 17}$$

In this case, the first column of the past matrix P is a time series which is the past of a time series of a first column of the future matrix F, etc. as far as the final column in the past matrix P, which is a time series which is the past of a time series from a final column of the future matrix F.

Covariance matrices $\Sigma_{PP}$, $\Sigma_{FF}$ and $\Sigma_{EE}$ are now defined for the past matrix P, the future matrix F and the error matrix E, and a cross-covariance matrix $\Sigma_{PF}$ is defined for the past matrix P and for the future matrix F.

$$\sum_{PP(m \times m)} = \frac{1}{N} \cdot P_{(m \times N+1-m)} \cdot P^T_{(N+1-m \times m)} \qquad \text{Equation 18}$$

$$\sum_{FF(n \times n)} = \frac{1}{N} \cdot F_{(n \times N+1-m)} \cdot F^T_{(N+1-m \times n)} \qquad \text{Equation 19}$$

$$\sum_{EE(n \times n)} = \frac{1}{N} \cdot E_{(n \times N+1-m)} \cdot E^T_{(N+1-m \times n)} \qquad \text{Equation 20}$$

$$\sum_{PF(m \times n)} = \frac{1}{N} \cdot P_{(m \times N+1-m)} \cdot F^T_{(N+1-m \times n)} \qquad \text{Equation 21}$$

For optimum prediction of the future matrix F, the matrices A and B are determined by means of a maximum likelihood method. The Equations 14 and 15 are for this purpose solved by means of canonical random variable analysis (CVA), as will be described in the following text, with regard to the optimum matrices A and B for a given covariance matrix $\Sigma_{EE}$ for the error matrix E.

It is assumed that the past vector p and the future vector f contain normal random variables, which are distributed with a mean value of zero and covariance matrices $\Sigma_{PP}$, $\Sigma_{FF}$ and $\Sigma_{EE}$. A maximum likelihood estimate of A, B and $\Sigma_{EE}$ is defined by the conditional probability $\tilde{P}$ (F|P; A, B, $\Sigma_{EE}$) for the future matrix F with a given past matrix P. The maximum likelihood estimate (MLE) is linked to the use of $\Sigma_{EE}$ and the estimation of A and B as the matrices which maximize the conditional probability $\tilde{P}$ for the given past matrix P and future matrix F of the observed process.

The theorem of canonical random variable analysis (CVA) states that, provided that the covariance matrices $\Sigma_{PP}$ and $\Sigma_{FF}$ for the past matrix P and for the future matrix F are not negatively defined matrices, square matrices J and L of order n and m then exist, for which:

$$J_{(m \times m)} \cdot \Sigma_{PP(m \times m)} \cdot J^T_{(m \times m)} = I_{rPP(m \times m)} \quad \text{Equation 22}$$

$$L_{(n \times n)} \cdot \Sigma_{FF(n \times n)} \cdot L^T_{(n \times n)} = I_{rFF(n \times n)} \quad \text{Equation 23}$$

$$J_{(m \times m)} \cdot \Sigma_{PF(m \times n)} \cdot L^T_{(n \times n)} = D_{(m \times n)} = \text{diag}(\gamma_1, \gamma_2, \ldots, \gamma_r, 0, \ldots, 0) \quad \text{Equation 24}$$

where $r_{PP}$ is the rank of $\Sigma_{PP}$, $r_{FF}$ is the rank of $\Sigma_{FF}$, and $\gamma_i$ represents the canonical correlations. I in general denotes the unit matrix. Canonical random variable analysis (CVA) (see, for example, Hotelling, H., Relations between two sets of variates, Biometrika, 28, 321-377, 1936) is a generalized singular value decomposition (see, for example, Stoer, J., Burlisch, R., Introduction to numerical analysis, Springer-Verlag, New York, 2002), which transforms the variables of a past vector p and of a future vector f to form random variables which are correlated in pairs. The matrices J and L are obtained by means of the singular value decomposition (SVD) of the cross-covariance matrix $\Sigma_{PF}$. Singular value decomposition is a type of eigen value decomposition and matrix transformation to a diagonal matrix. The singular values $\gamma_i$ are organized on the basis of their magnitude and describe the magnitudes and directions in which this map or transformation acts.

Substitution of the canonical random variable analysis into the logarithm of the probability function $\tilde{P}(F|P; A, B, \Sigma_{EE})$, substitution of $\Sigma_{EE}$ and maximization over A and B results in the following estimates for A:

$$\hat{A}_{(r \times m)} = (I_r, 0)_{(r \times m)} \cdot J_{m \times m} \quad \text{Equation 25}$$

where $\hat{A}$ is formed from the first r rows of J, and, for B $$\hat{B}_{(n \times r)} = (I_r, 0)_{(r \times n)} \cdot L_{(n \times n)} \quad \text{Equation 26}$$

where $\hat{B}$ is formed from the first r rows of L. The following expression is obtained for M from Equation 15

$$M_{(r \times N+1-m)} = (I_r, 0)_{(r \times m)} \cdot J_{(m \times m)} \cdot P_{(m \times N+1-m)} \quad \text{Equation 27}$$

or, for a time k, from Equation 12

$$m_{(r)} = (I_r, 0)_{(r \times m)} \cdot J_{(m \times m)} \cdot p_{(m)} \quad \text{Equation 28}$$

and Equation 13

$$f_{(n)} = (I_r, 0)_{(n \times r)} \cdot L_{(n \times n)} \cdot m_{(r)} \quad \text{Equation 29}$$

The rank r of the memory matrix M, that is to say the optimum dimension r of the memory matrix M, must now be determined in order to predict the future matrix F. The optimum rank r is obtained from the number of dominant or greatest canonical correlations $\gamma_i$. The number of dominant canonical correlations is selected as the number that produces the best out of sample one step ahead prediction or predictions of the next sample value from past values which have not been used for modelling.

The present invention uses canonical random variable analysis (CVA) in order to predict the channel coefficients of a respective propagation path for a mobile radio channel with multipath propagation from a finite number of states from the past. The individual steps in a method according to the present invention for prediction of a channel coefficient will be described in the following text.

The sequence or time series $x_k$, k=1, 2, . . . , N, N+1, N+2, . . . , N+n with the length N+n is assumed to be given. In the case of pilot signals, for example the pilot signal which is transmitted in the common pilot channel CPICH of the UMTS mobile radio system, the values $x_k$ in the time series are the estimated values which have not been filtered with respect to the noise for the respective current channel coefficients $c_k$ which are obtained from the correlation of a received symbol $y_k$ with a respective known pilot symbol $p_k$, $x_k = y_k/p_k$. The received and known time series $x_k$ of estimated values of length n+N is subdivided into a past from k=1 to k=N, and a future from k=N+1 to k=N+n, and the past matrix P is produced from this using Equation 16 from past vectors of dimension m and the future matrix F is produced from this using Equation 17 from future vectors of dimension n. The optimum dimension m and the number of components of the past vectors p of the matrix P are determined for the time series $x_k$. The dimension m depends on how many data items are used for prediction and how many data items are used for trial and error prediction, and is preferably determined as a function of which dimension of the errors in the channel estimation process is the smallest. Two thirds of the data is preferably used for calculation purposes for the invention.

Once the past matrix P and the future matrix F have been produced, the equation system based on the Equations 14 and 15 is solved by means of the canonical random variable analysis (CVA) by calculating the cross-covariance matrix $\Sigma_{PF}$ on the basis of Equation 21 from the past matrix P and the future matrix F, with singular value decomposition of the cross-covariance matrix $\Sigma_{PF}$ being carried out in order to determine the matrices J and L, and with the estimates $\hat{A}$ and $\hat{B}$ being calculated for the matrices A and B using the matrices J and L from the Equations 25 and 26, with the memory matrix M being calculated using the Equation 15 and the rank of the memory matrix M, that is to say the optimum dimension r of the memory vectors of the matrix M in order to predict the future matrix F being selected so as to achieve the best prediction of the next sample value from past values which have not been used for modelling and, finally, with the prediction vector f being calculated from a past vector p from Equation 7, in which new estimated values or measured values are used, using Equation 13 with the matrices $\hat{A}$ and $\hat{B}$. The estimated future $\hat{x}_{N+1}$ of the channel coefficient can now be obtained from f.

In one exemplary embodiment of the invention, the pilot signal transmitted in UMTS mobile radio systems is used for channel estimation. The fundamental channel model is transferred from the 3GPP Standard. This is the fading model based on Rayleigh-Jakes with a so-called classical Doppler spectrum. In the case of calculations in which, for example, the mobile station is assumed to have a relative speed of 200 km/h, the CVA estimation method results in the prediction of the channel coefficients and of the pilot signal being improved by about 15% in comparison to the prediction using a Wiener filter.

Figure 7:
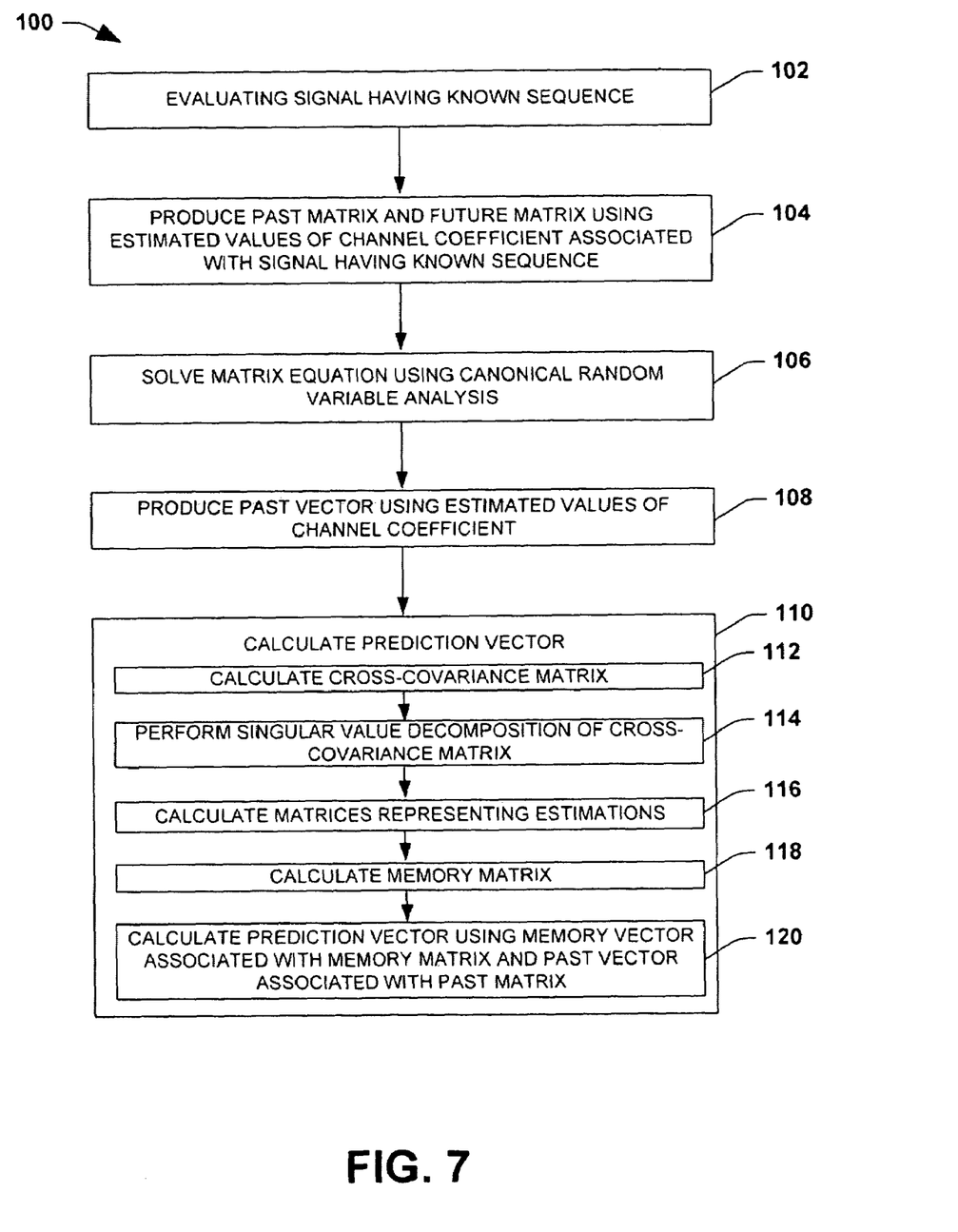
FIG. 7 is a flow chart illustrating a method for predicting a channel coefficient for a propagation path in a channel with multipath propagation, according to one embodiment of the invention.

FIG. 7 illustrates one exemplary embodiment of a method 100 for predicting a channel coefficient for a propagation path in a mobile radio channel with multipath propagation. The method 100 uses a canonical random variable analysis on a signal having a known sequence to predict the channel coefficient comprising evaluating the signal 102 having the known sequence to identify a sequence of values $x_k$ associated therewith. The method 100 further comprises producing a past matrix P and a future matrix F from the identified sequence 104 of values $x_k$, and solving matrix equation using canonical random variable analysis 106. The method 100 further comprises producing a past vector using estimated values of channel coefficient 108, and calculating a prediction vector f for estimated values of the channel coefficient by method 110. For example, in one embodiment the prediction vector can be generated by method 110 that comprises calculating a cross-covariance matrix 112, and performing a singular value decomposition of the cross-covariance matrix 114. The method 110 further comprises calculating matrices representing estimations 116, and calculating memory matrix 118. At 120 the prediction vector is calculated using memory vector associated with memory matrix and past vector associated with past matrix.

Although the present invention has been described above with reference to one preferred exemplary embodiment, it is not restricted to this but can be modified in a wide range of ways.

In particular, any desired signal whose symbol sequence is known can be used for channel estimation, and the invention can be used for any desired mobile radio system in which channel estimation is used.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for prediction of a channel coefficient in a wireless communication device adapted to communicate over a propagation path in a mobile radio channel with multipath propagation, comprising:

using a canonical random variable analysis on a signal having a known sequence to predict the channel coefficient in the wireless communication device, wherein using the canonical random variable analysis comprises:

producing a past matrix P and a future matrix F from a known time series $x_k$ of estimated values of the channel coefficient, wherein $x_k$ is associated with the signal having the known sequence;

solving the equation system:

$$F = B \cdot M + E$$

$$M = A \cdot P$$

in order to obtain estimates $\hat{A}$ and $\hat{B}$, for matrices A and B, wherein F is the future matrix, P is the past matrix, M is a memory matrix representing an intermediate set of variables and a finite number of past states of the respective channel coefficient, E is an error matrix that contains prediction error variables and represents an error in a linear prediction of the future matrix;

producing a past vector p from a new time series of known estimated values of the channel coefficient; and calculating a prediction vector $\hat{f}$ for estimated values of the channel coefficient from the equations:

$$\hat{f} = \hat{B} \cdot m$$

$$m = \hat{A} \cdot p,$$

wherein m is an optimum dimension portion of the memory matrix identified by ascertaining canonical correlations.

2. The method of claim 1, wherein the method is used in an estimator for channel coefficients in a base station or in a mobile station in a mobile radio system.

3. The method of claim 1, further comprising estimating the channel coefficient using the prediction vector $\hat{f}$.

4. A method for prediction of a channel coefficient in a wireless communication device adapted to communicate over a propagation path in a mobile radio channel with multipath propagation, comprising:

using a canonical random variable analysis on a signal having a known sequence to predict the channel coefficient for the wireless communication device, wherein using the canonical random variable analysis to predict the channel coefficient comprises:

evaluating the signal having the known sequence to identify a sequence of values $x_k$ associated therewith, wherein k comprises a discrete integer time variable;

producing a past matrix P and a future matrix F from the identified sequence of values $x_k$, and using the past matrix P and the future matrix F to generate a prediction vector $\hat{f}$, wherein a portion of the prediction vector $\hat{f}$ represents the predicted channel coefficient.

5. The method of claim 4, wherein the sequence of values $x_k$ comprise estimated values of the channel coefficient, and wherein the sequence of values $x_k$ extends over a discrete time sequence of k=1 to N+n, wherein the sequence k=1 to N represents values of the channel coefficient in the past, and wherein the sequence k=N to n represents values of the channel coefficient in the future based on the signal having a known sequence.

6. The method of claim 4, wherein using the past matrix P and the future matrix F to generate the prediction vector $\hat{f}$ comprises:

calculating a cross-covariance matrix $\Sigma_{PF}$ from the past matrix P and the future matrix F;

performing a singular value decomposition of the cross-covariance matrix $\Sigma_{PF}$ to determine square matrices J and L;

using the square matrices J and L to calculate matrices $\hat{A}$ and $\hat{B}$ representing estimations of matrices A and B, respectively;

using the past matrix P and the estimated matrix $\hat{A}$ to calculate a memory matrix M; and using the matrices $\hat{A}$ and $\hat{B}$ along with a memory vector m associated with the memory matrix M and a past vector associated with the past matrix P to calculate the prediction vector $\hat{f}$.

7. A method of predicting a channel coefficient for estimating a channel impulse response in a wireless communication device, comprising:

receiving a signal having a known sequence at the wireless communication device; and evaluating the signal using canonical random variable analysis to determine the channel coefficient, wherein using the canonical random variable analysis to evaluate the signal and determine the channel coefficient comprises:

evaluating the signal having the known sequence to identify a sequence of values $x_k$ associated therewith, wherein k comprises a discrete integer time variable;

producing a past matrix P and a future matrix F from the identified sequence of values $x_k$; and using the past matrix P and the future matrix F to generate a prediction vector f̂, wherein a portion of the prediction vector f̂ represents the predicted channel coefficient.

8. The method of claim 7, wherein using the past matrix P and the future matrix F to generate the prediction vector f̂ comprises:

calculating a cross-covariance matrix $\Sigma_{PF}$ from the past matrix P and the future matrix F;

performing a singular value decomposition of the cross-covariance matrix $\Sigma_{PF}$ to determine square matrices J and L;

using the square matrices J and L to calculate matrices Â and B̂ representing estimations of matrices A and B, respectively;

using the past matrix P and the estimated matrix Â to calculate a memory matrix M; and using the matrices Â and B̂ along with a memory vector m associated with the memory matrix M and a past vector associated with the past matrix P to calculate the prediction vector f̂.

* * * * *